Figure 1:
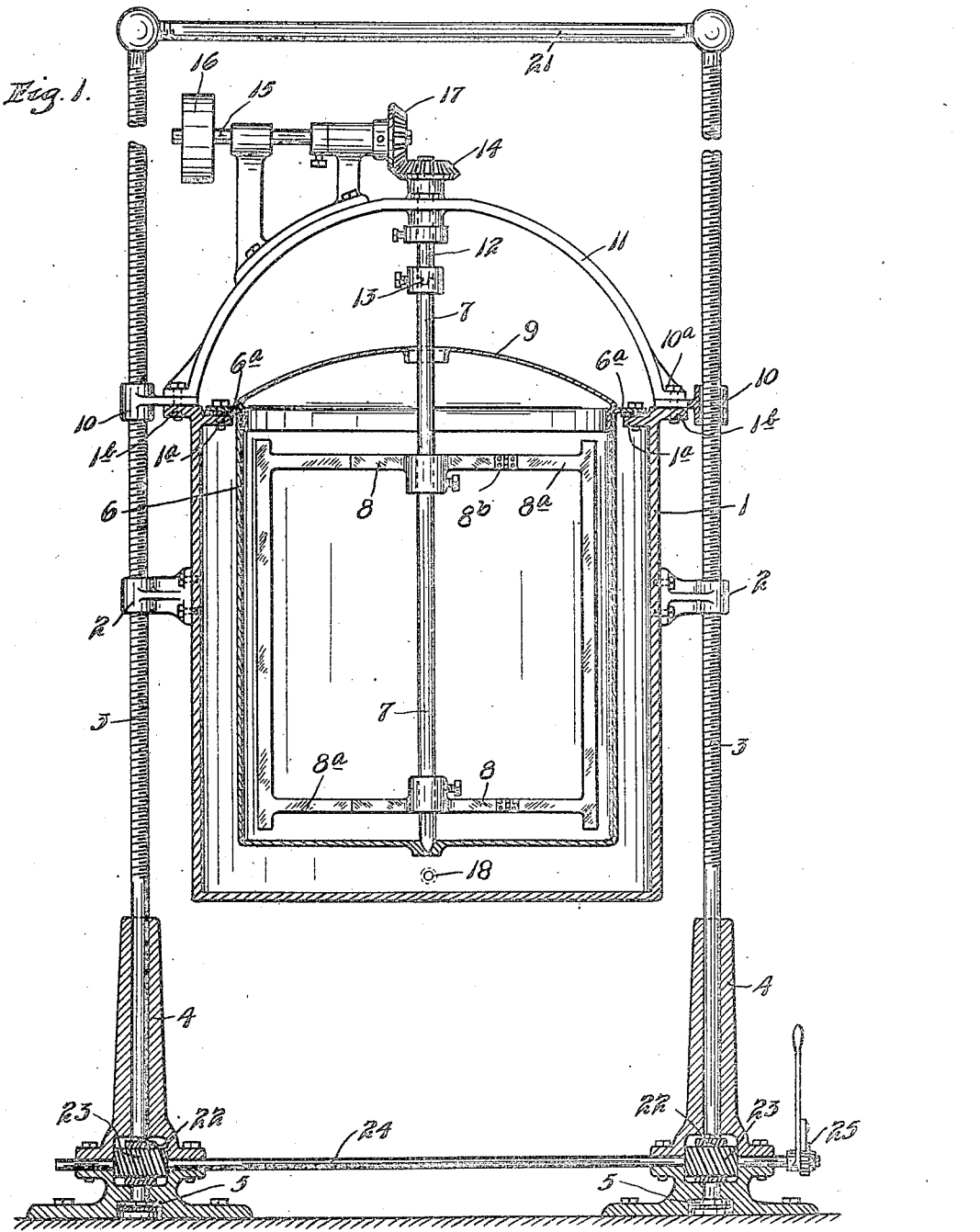

Feb. 6, 1923.
1,444,090

C. J. WESTERGAARD.
ADJUSTABLE STARTER CAN.
FILED JUNE 30, 1921.

2 SHEETS-SHEET 1

INVENTOR,
CARL J. WESTERGAARD.
BY HIS ATTORNEY.
James F. Williamson

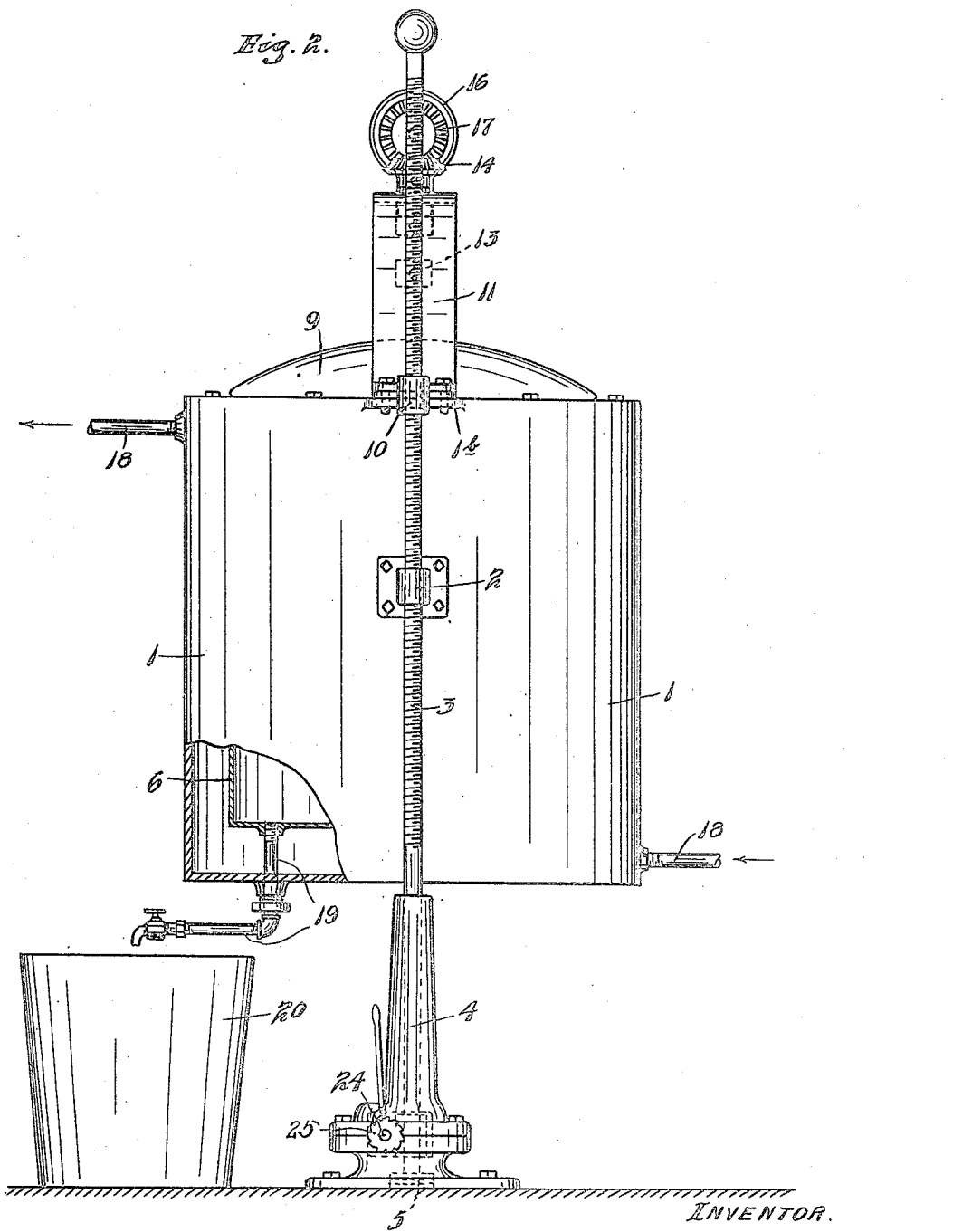

Patented Feb. 6, 1923.

1,444,090

UNITED STATES PATENT OFFICE.

CARL J. WESTERGAARD, OF MINNEAPOLIS, MINNESOTA.

ADJUSTABLE STARTER CAN.

Application filed June 30, 1921. Serial No. 481,633.

*To all whom it may concern:*

Be it known that I, CARL J. WESTERGAARD, a subject of the King of Denmark, but have taken out first papers to become a citizen of the United States, residing at Minneapolis, in the county of Hennepin and State of Minnesota, have invented certain new and useful Improvements in Adjustable Starter Cans; and I do hereby declare the following to be a full, clear, and exact description of the invention, such as will enable others skilled in the art to which it appertains to make and use the same.

This invention relates to an apparatus for treating milk or cream generally known as a "starter" can and it is in such apparatus that the milk or cream is given one of its first treatments. Such starter cans are made of considerable capacity and the contents thereof are discharged into smaller cans. It is necessary, therefore, that the starter can be raised to a sufficient height to have one of the smaller cans disposed thereunder.

It is an object of this invention, therefore, to provide a starter can of simple and convenient design and one which is supported on means adapted to raise and lower the same.

It is a further object of the invention to provide such a can of simple and neat design having the driving mechanism therefor supported at the top thereof.

These and further objects and advantages of the invention will more fully appear from the following description made in connection with the accompanying drawings in which like reference characters refer to the same parts throughout the different views and in which—
Fig. 1 represents a central vertical section of the device; and Fig. 2 is a view in side elevation of the device, as seen from the left of Fig. 1, a portion thereof being shown in section.
Referring to the drawings, the device comprises the outer vessel 1 of cylindrical shape having secured to its sides at opposite points, brackets 2. These brackets are threaded and vertical screws 3 pass therethrough, which screws are disposed at their lower ends in frame brackets 4 and are supported at their lower ends on roller bearings 5. The vessel 1 is provided at its upper open end with an inwardly projecting flange 1ª and is also provided with outwardly extending oppositely disposed lugs 1ᵇ. A vessel 6 of cylindrical form but of smaller dimensions than the vessel 1 is supported therein. The supporting means comprises an outwardly extending flange 6ª at the top of the smaller vessel, which flange is bolted to the flange 1ª, a suitable steam-tight packing being inserted between said flanges. The vessel 6 is provided with a step bearing centrally of its bottom and a vertical shaft 7 is supported in said bearing and has secured thereto within the vessel 6 a stirrer paddle member 8. This member 8 comprises spaced hub portions rigidly secured to shaft 7, each of which has oppositely extending arms, to the ends of which are secured by hinges 8ᵇ the paddle members 8ª. A cover 9 is adapted to fit within the top of the vessel 6 to rest thereon and is provided with a central aperture through which passes the shaft 7.

The space between the vessels 1 and 6 forms a steam chamber and inlet and outlet steam pipes 18 are connected to this chamber. The vessel 6 is also provided with a drain pipe 19 equipped with the usual valve faucet through which the contents of the vessel are discharged into a suitable smaller can 20.

Disposed intermediately on top of the lugs 1ᵇ are oppositely extended arms carrying at their ends apertured lugs 10 forming guiding members through which the screws 3 pass, said lugs being bored to have a smooth sliding fit on said screws. A frame member 11 of substantially semi-circular shape, has oppositely extending lugs at its lower portions superposed on the arms carrying the lugs 10 and are bolted therewith to the lugs 1ᵇ, one set of bolts 10ª passing through all of said members. A frame member 11 is provided with a top central hub in which is rotatably mounted a shaft 12 and this shaft is in alinement with and is connected at its lower end to the upper end of the shaft 7 by any suitable type of coupling 13. A collar secured to the shaft 12 by a set screw immediately under the central hub of bracket 11 prevents upward movement of said shaft and a beveled gear 14 is secured to the upper end of said shaft. A horizontal shaft 15 provided with a pulley 16 and journaled in a spaced bearing bracket bolted to the top of the frame 11 has secured to one end a beveled gear 17 meshing with the beveled gear 14, said shaft also being held against longitudinal movement by a collar secured thereto adjacent one of its bearings.

The screws 3 are connected at their top portions by a transverse rod 21 and are provided adjacent their lower ends in a recess formed in the brackets 4, with helical or other gears 22 which mesh with similar gears 23 secured to a shaft 24 extending between and journaled in the brackets 4 and having at one end thereof a handle-equipped ratchet mechanism 25. As shown, the brackets 4 are adapted to be securely bolted to the floor or a foundation.

The material to be treated is placed in the vessel 6 through the top portion thereof, the cover 9 being raised for this purpose. Steam being turned into the steam chamber about this vessel, and power being applied to the pulley 16 by a belt connected to a rotatable driving means, the milk will be heated and constantly stirred by the paddles 8ª until sufficiently treated. The milk can then be discharged through the pipes 19. The vessels and 1 and 6 and the attached parts can be readily raised and lowered to the desired height by manipulation of the ratchet mechanism 25, which, through the shaft 24 and the described gears, will turn the screws 3 and raise or lower the nut lugs 2. Flexible steam connections can be connected to the pipes 18 and the device can either be brought to a fixed position to properly position the driving belt for pulley 16, or said belt can be equipped with a suitable belt tightener.

From the above description it is seen that applicant has produced a very simple type of starter can and one which can be very easily and quickly raised and lowered. This raising and lowering is a very desirable feature in such an apparatus as it greatly facilitates the filling of the cans therefrom. In practice, the vessel 6 will preferably be lined with aluminum. If it is desired to clean the vessel 6, which must often be done, the coupling 13 will be loosened and moved to disconnect shafts 7 and 12 and the shaft 7 will then be swung to one side to clear the shaft 12. The stirrer 8 can be folded by means of its hinges 8ᵇ and the shaft 7 raised from its lower bearing and the cover 9 can then be slid out through the opening between the shafts 7 and 12. Shaft 7 with the stirrer 8 can then be removed and the interior of the vessel 6 easily cleaned.

It will, of course be understood that various changes may be made in the form, details and arrangement of the device without departing from the scope of applicant's invention, which generally stated, consists in the matter shown and described and defined in the appended claims.

What is claimed is:

1. A starter can comprising a cylindrical vessel, laterally extending lugs disposed on opposite sides of the same, elevating means passing through said lugs and forming supports therefor, a smaller cylindrical vessel supported in said first mentioned vessel, the space between said vessels forming a steam chamber, a stirrer rotatably mounted in said smaller vessel, and means supported above said vessel for rotating said stirrer.

2. The structure set forth in claim 1, a frame secured to the said first mentioned vessel and extending above the same carrying the driving means for said stirrer, and oppositely disposed lugs secured to said frame and embracing said screws to form guiding means.

3. The structure set forth in claim 1, said elevating means comprising rotatable screws, and means for simultaneously turning the same to elevate or lower said vessels and the parts carried thereby.

4. A starter can having in combination a generally cylindrical vessel, supporting means therefor adapted to raise and lower the same, a cylindrical vessel disposed within said vessel and spaced therefrom to form therewith a steam chamber, a vertical shaft supported in the bottom of said last mentioned vessel, a stirrer member secured to said shaft, a cover member in said last mentioned vessel having an aperture through which said vertical shaft passes, a frame extending above and secured to said first mentioned vessel, a vertical shaft secured therein in alinement with said first mentioned vertical shaft, a detachable coupling connecting said shafts, and means on said frame for driving said vertical shaft carried thereby.

5. A device of the class described having in combination spaced frame members, a rotatable shaft extending between and journaled in said frame members, means for rotating said shaft, spaced vertical screws journaled in said frame members, a gearing on said first mentioned shaft co-operating with gearing on said screws to simultaneously rotate the same, a starter can provided with driving mechanism and having lugs secured thereto, said lugs forming nuts engaged with said screws and also having lugs secured thereto and engaging said screws to form guiding means whereby said starter can be raised and lowered by the rotation of said screws.

6. A starter can comprising inner and outer spaced concentric cylindrical vessels, outwardly projecting threaded lugs at the opposite sides of the outer vessel, a pair of spaced rotatable screws in engagement with said lugs, means for rotating said screws to raise and lower said vessels, and guiding means on said screws for said vessels.

7. A starter can comprising an outer cylindrical casing, an inner casing concentric therewith, a rotatable stirrer in said inner casing, driving means for the stirrer carried by said outer casing, oppositely disposed outwardly projecting threaded lugs secured to said outer casing and spaced rotatable screws engaging said lugs for supporting said can and raising and lowering the same.

In testimony whereof I affix my signature.

CARL J. WESTERGAARD.